US009742316B2

United States Patent
Durand et al.

(10) Patent No.: US 9,742,316 B2
(45) Date of Patent: Aug. 22, 2017

(54) APPARATUS AND MEANS FOR STARTING OF AC MOTORS, ALGORITHM FOR SELF-ADAPTING MOTOR START WITH SOFT-STARTER

(71) Applicant: Schneider Electric Industries SAS, Rueil Malmaison (FR)

(72) Inventors: Christophe Durand, Grenoble (FR); Delcho Penkov, Saint Martin d'Heres (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 145 days.

(21) Appl. No.: 14/693,165

(22) Filed: Apr. 22, 2015

(65) Prior Publication Data

US 2015/0311828 A1    Oct. 29, 2015

(30) Foreign Application Priority Data

Apr. 23, 2014 (FR) ..................................... 14 53654

(51) Int. Cl.
*H02P 1/16* (2006.01)
*G01L 25/00* (2006.01)
(Continued)

(52) U.S. Cl.
CPC . *H02P 1/28* (2013.01); *H02P 1/04* (2013.01)

(58) Field of Classification Search
CPC ...... H02P 1/28; H02P 1/26; H02P 3/18; H02P 23/20; H02P 1/42
(Continued)

(56) References Cited

U.S. PATENT DOCUMENTS

2009/0058341 A1    3/2009  Lu et al.
2010/0060227 A1*   3/2010  Zocholl ................ H02H 7/0816
                                                              318/778
(Continued)

FOREIGN PATENT DOCUMENTS

EP    2 403 132 A2    1/2012
JP    2008-043140     2/2008

OTHER PUBLICATIONS

U.S. Appl. No. 14/693,095, filed Apr. 22, 2015, Penkov, et al.
(Continued)

*Primary Examiner* — Bentsu Ro
*Assistant Examiner* — Zemenay Truneh
(74) *Attorney, Agent, or Firm* — Oblon, McClelland, Maier & Neustadt, L.L.P.

(57) ABSTRACT

The invention relates to a method of starting an electric motor (10) powered by an alternating power supply voltage, said method consisting of supplying current to the motor (10) with a delay $t_{ret}$ during each period of the power supply voltage. The starting method comprises a first sequence in which the following steps are carried out during each $n^{th}$ period of the power supply voltage, where n is an integer number greater than 0: a) determine the value of a variation of a resistance of the electric motor during the previous n periods of the power supply voltage; b) compare said value of the variation of the determined motor resistance with a first threshold resistance value; c) if the value of the variation of the motor resistance is less than the first threshold value, reduce $t_{ret}$. The invention also relates to a starter device and a computer program.

13 Claims, 2 Drawing Sheets

(51) Int. Cl.
*H02P 1/28* (2006.01)
*H02P 1/04* (2006.01)

(58) Field of Classification Search
USPC ................................ 318/778, 430, 432, 434
See application file for complete search history.

(56) References Cited

U.S. PATENT DOCUMENTS

2011/0148332 A1    6/2011   Kawano et al.
2011/0276301 A1   11/2011   Wu et al.

OTHER PUBLICATIONS

French Preliminary Search Report issued Mar. 6, 2015 in French Application 14 53654, filed on Apr. 23, 2014 ( with English translation of Categories of Cited Documents).

* cited by examiner

APPARATUS AND MEANS FOR STARTING OF AC MOTORS, ALGORITHM FOR SELF-ADAPTING MOTOR START WITH SOFT-STARTER

TECHNICAL FIELD

The invention relates to the field of electric motors powered by alternating voltages and more particularly methods of starting such motors.

STATE OF PRIOR ART

It is known that current demand when alternating electric motors are started can be limited by using a starter device such as an electronic starter.

Such a starter device is placed between the alternating power supply circuit and the motor and can reduce the power supply current to the motor, by means of progressive increase in the current supply. To achieve this, the device comprises at least one controlled switch for each phase of the power supply circuit, that connects and disconnects the motor to and from said phase of the power supply circuit. During operation and for each phase in the power supply circuit, the motor is reconnected by the power supply circuit with a delay thus limiting the motor power supply time and therefore the rise in the current during each period of the power supply voltage. Current demand is thus avoided.

Generally, the switches of such a starter device comprise a first and a second thyristor connected in inverse parallel for each phase of the power supply circuit and that are designed to connect the motor to said phase in positive and negative voltage alternations respectively of this phase. For each alternation of the current passing through the thyristor, the trigger of the corresponding thyristor is powered with a delay relative to the corresponding voltage alternation so as to generate a current interruption with a variable duration by the thyristor and to connect the motor to the power supply voltage with a delay thus supplying power to the motor at reduced current.

Adjustment of this delay in power supply to the trigger may be either of the alpha ($\alpha$) type, in other words the trigger is powered with a delay corresponding to an angle $\alpha$ after the voltage in the corresponding phase passes through zero, or of the gamma ($\gamma$) type, in other words the trigger is powered with a delay corresponding to an angle $\gamma$ after the current in the corresponding phase passes through zero. For the angle $\alpha$, and also for the angle $\gamma$, these two delays that correspond to times of $\alpha T/2\pi$ and $\gamma T/2\pi$ respectively where T is the period of the power supply voltage, correspond to a delay $t_{ret}$ in the motor current supply.

Nevertheless, regardless of which type of adjustment is chosen, the adjustment of the power supply delay is of overriding importance, particularly in the first instants while the motor is starting. The motor cannot start if the delay $t_{ret}$ is too long, while if the delay $t_{ret}$ is too short, it is impossible to obtain a significant reduction in the current demand when the motor starts.

Thus, in order to optimise regulation of the delay $t_{ret}$ of the power supply current to the motor, either at the first start instant or during the remainder of starting, document EP 2403132 A2 discloses a method for adjusting the delay $t_{ret}$ as a function of the motor rotation frequency. To achieve this, this document discloses two successive motor starting sequences, a first sequence dedicated to low speeds in which a Volts per Hertz algorithm is used (called an open loop algorithm) to determine the motor speed and a second sequence dedicated to high speeds in which the motor rotation frequency is determined by a comparison of the motor speed control and the real or estimated speed.

Nevertheless, although the method disclosed in EP 2403132 A2 enables satisfactory starting of the motor, it is difficult to implement. Such a method makes use of two different functioning sequences and also requires setting up a relatively complex transition sequence. Furthermore, in order to perform these two sequences, the voltage and the current of the power supply circuit and the motor both have to be controlled which makes the starter device significantly more complex.

PRESENTATION OF THE INVENTION

The purpose of the invention is to overcome this disadvantage and its purpose is thus to provide a method for starting a motor that in particular can define an optimised power supply delay $t_{ret}$, at least in first starting instants, that does not make it necessary to increase the complexity of the starter device as is the case for the method according to prior art.

To achieve this, the invention relates to a method of starting an electric motor powered by an alternating power supply voltage, said method consisting of supplying current to the motor during each voltage supply period with a delay $t_{ret}$, said starting method comprising a first sequence in which the following steps are carried out in each $n^{th}$ period of the power supply voltage, where n is an integer number greater than 0:

a) determine the value of a variation of a resistance of the electric motor during the previous n periods of the power supply voltage, b) compare said value of the variation of the determined motor resistance with a first threshold resistance value, c) if the value of the variation of the motor resistance is less than the first threshold value, reduce $t_{ret}$.

With such a method, all that has to be determined is the variation of the resistance of the electric motor, which requires monitoring of either the power supply current and voltage on the input side of the starter device, or the motor input current and voltage on the output side of the starter device. The resistance of the motor is directly related to the motor rotation speed and therefore it is easy to control the delay depending on the rotation speed.

Furthermore, unlike the method according to prior art, the method is robust facing changes or drifts in the power supply circuit because it is based simply on a calculation of the variation in resistance.

Step a) is a step to determine a relative variation in time of the motor resistance $$\frac{\frac{\Delta R}{R}(t)}{\Delta t},$$

said relative time variation preferably being calculated using the following equation:

$$\frac{\frac{\Delta R}{R}(t)}{\Delta t} = \frac{\frac{R(t) - R(t-nT)}{R(t-nT)}}{nT}$$

where R(t) is a value related to the motor resistance determined at instant t and T is the duration of a period of the alternating power supply voltage.

Steps a) to c) may be applied after an initial duration $t_{int}1$.

Such an initialisation time during which there is no readjustment of the delay $t_{ret}$, means that transient conditions related to start up of the motor power supply do not need to be taken into account.

After a reduction in the delay $t_{ret}$, the first sequence may be repeated after a waiting time $t_{int}2$ preferably equal to $t_{int}1$.

With such a second initialisation time, it is possible to avoid taking account of transient conditions that could disturb the method according to the invention.

The first sequence may include the following additional step:

d) if the value of the variation in the determined motor resistance is equal to or greater than the first threshold value, go on to a second sequence in the starting method, said second sequence comprising the following steps performed every $m^{th}$ period of the power supply voltage, where m is an integer more than 0:

e) determine the value of a variation in the motor resistance, f) compare said value of the variation of the determined motor resistance with a second threshold resistance value, g) if the variation in the determined resistance of the motor is less than that the second threshold resistance value, reduce $t_{ret}$.

Such a second phase can improve regulation of the current demand from the motor after the motor has started to rotate.

During step e), an acceleration or speed of the motor can also be determined from the variation in the motor resistance.

Determined obviously means estimated. Since the resistance of the motor varies with its speed, it can be estimated from the resistance of the motor if the motor is accelerating or decelerating, and even a rotation speed of the motor.

In step e) the variation of the determined resistance value may be a value corrected over at least two periods of the power supply voltage.

Step f) may be a step to determine the value of the relative variation of the motor resistance in time, preferably calculated using the following equation:

$$\frac{\frac{\Delta R}{R}(t)}{\Delta t} = \frac{\frac{R(t) - R(t-mT)}{R(t-mT)}}{mT}$$

where R(t) is the resistance value of the motor determined at instant t and T is the duration of a period of the alternating power supply voltage.

The following additional step may also be included in the second sequence:

h) compare the motor power supply current at instant t with the value of the motor power supply current at instant t−mT, where T is the duration of a period of the alternating power supply voltage, i) if the motor power supply current at instant t is less than the value of the motor power supply current at instant t-mT, connect the motor to the power supply circuit directly, and the motor is then started.

Such steps enable good detection of motor start up and therefore optimised transition between the motor startup power supply according to the invention and the motor normal power supply.

If the delay $t_{ret}$ is reduced in step g) and the second threshold resistance value is increased, a waiting time $t_{int}3$ may be defined before repeating the second sequence.

The invention also relates to a device for starting an electric motor powered by an alternating power supply voltage, said device comprising:

means of delaying the motor power supply adapted to delay the motor power supply with a delay $t_{ret}$, means of measuring the power supply current to the motor on the output or input side of the delay means, means of determining the motor power supply voltage on the input or output side of the delay means, a processing and control unit adapted to control the delay, and the current determination and voltage determination means, The processing and control unit being adapted to determine the variation in the motor resistance and to modify the delay $t_{ret}$ as a function of the variation of the motor resistance using a method according to the invention, starting from the motor power supply current and voltage determination means.

Such a starter device enables optimised starting of the motor.

The invention also relates to a computer program comprising program code instructions to run steps to determine a variation of a motor resistance, to compare said variation with a threshold resistance value and to reduce the delay $t_{ret}$ if the variation is less than the threshold value according to the invention.

BRIEF DESCRIPTION OF THE DRAWINGS

This invention will be better understood after reading the description of example embodiments given purely for information and in no way limitative, with reference to the appended drawings in which.

The different parts shown in the figures are not necessarily at the same scale to make the figures more easily readable.

The different possibilities (variants and embodiments) shall be understood as not being mutually exclusive and they can be combined together.

DETAILED PRESENTATION OF PARTICULAR EMBODIMENTS

Figure 1:
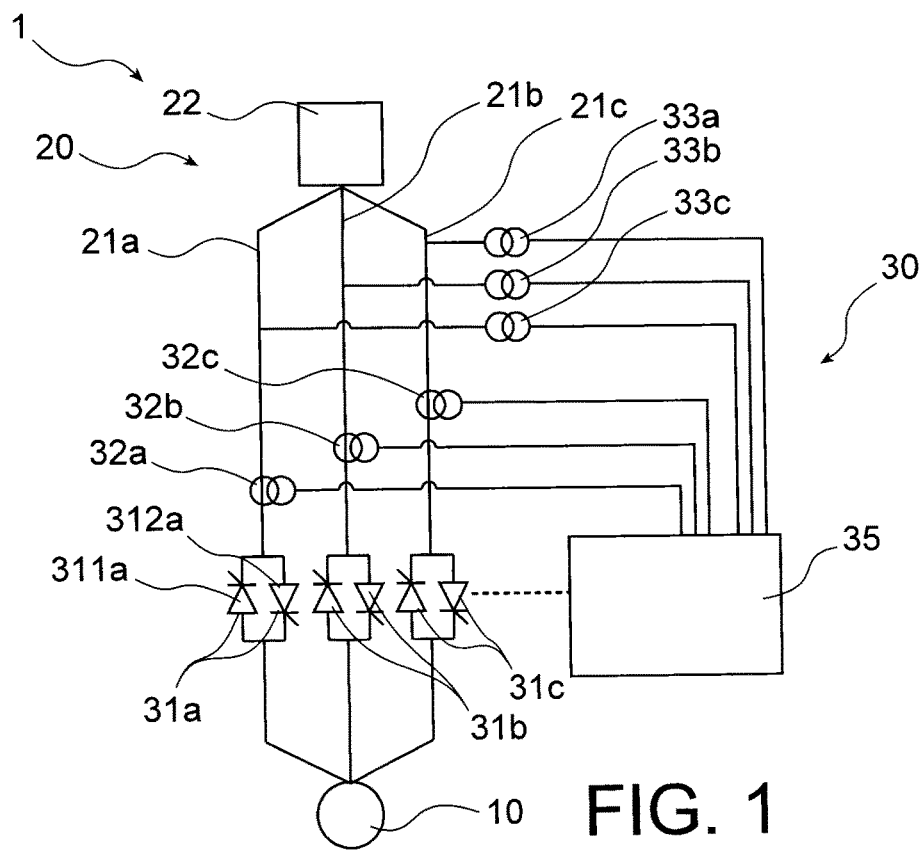
FIG. 1 shows an example of a power supply circuit to a motor comprising a starter device according to the invention.

FIG. 1 shows an installation 1 comprising an alternating electric motor 10 and a power supply circuit 20 to the motor 10, a starter device 30 being placed between the motor 10 and the power supply circuit 20 so as to limit the current demand when the motor 10 starts.

In FIG. 1, the power supply circuit is a three-phase power supply circuit 20 that supplies current to the motor through its three phases 21a, b, c and a transformer 22.

Such a starter device 30 comprises the following for each phase of the power supply circuit:

a controlled switch 31a, b, c to connect and disconnect the motor 10 to and from said phase of the power supply circuit 20, a power supply current measurement system 32a, b, c,
a power supply voltage measurement system 33a, b, c.

The starter device also comprises a processing and control unit 35 adapted to process values of voltages and currents obtained by systems for measuring the power supply current 32a, b, c and voltage 33a, b, c and to control controlled switches 31a, b, c based on these values.

Each controlled switch 31a, b, c comprises two thyristors 311a, 312a mounted in anti-parallel as shown in FIG. 1. In this way, the thyristors 311a, 312a in one phase of the power supply circuit are capable of connecting the motor to said phase 21a, b, c of the power supply circuit 20 in positive alternation and in negative alternation respectively of the current in this phase. The processing and control unit 35 is configured to individually power each of the triggers, not referenced, of the thyristors 311a, 312a and thus control closing of these thyristors when they are powered with the appropriate voltage alternation of the corresponding phase.

Each switch 31a, b, c thus provides a means of delaying the power supply to the motor 10 adapted to delay the current power supply of the motor with a delay $t_{ret}$.

The power supply voltage measurement systems 33a, b, c are arranged to enable a voltage measurement on each phase of the power supply circuit on the input side of the controlled switched 31a, b, c.

The current measurement systems 32a, b, c each form a means of determining the motor power supply current on the input side of the corresponding switch 31a, b, c.

The processing and control unit 35 is configured so that a resistance of the switch/motor combination called the switch/motor resistance can be determined from values measured by the different power supply current and voltage measurement systems 32a, b, c and 33a, b, c. This switch/motor resistance is preferably determined by calculating a positive component that is a value of symmetric components. Such a value has the advantage that it provides a value that reflects the condition of the motor considering the three phases. Such a calculation can be obtained using steps as follows:

- determine fundamental values of the current on the input and output sides and the voltage on the input side of the controlled switches 31 a, b, c at the network frequency, making use of current and voltage measurement systems 32a, b, c and 33a, b, c,
- use these fundamental values to calculate positive components of the current and voltage,
- divide the voltage's positive component by the current's positive component so as to obtain the positive phase-sequence resistance.

Figure 2:
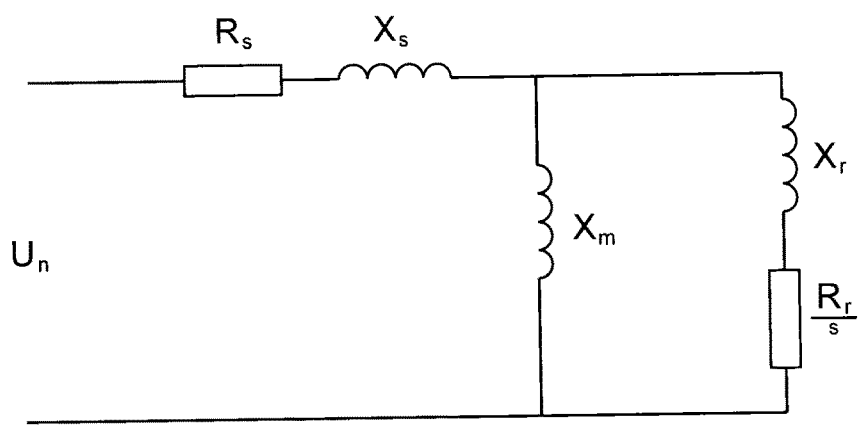
FIG. 2 shows an equivalence diagram of an asynchronous type of electric motor.

Since the resistance of the switches 31a, b, c does not vary as a function of the motor rotation speed 10, and since the resistance of the thyristors is low and therefore negligible in the conducting state, any variation in the switch/motor resistance is largely due to a variation in the motor resistance. FIG. 2 thus shows an equivalence diagram applicable at the stator of an asynchronous type motor 10 for which the invention is particularly useful. It can be seen that the resistive components of such a motor 10 have two contributions, a constant resistance Rs (Stator resistance) and a variable resistance $$\frac{Rr}{s}$$

(Rotor resistance) that is inversely proportional to the motor slip s.

When the motor starts, the motor slip s varies from a value of 1 for the motor stopped to a value typically less than 1%, corresponding to the motor rotating at nominal speed. Therefore the result is that when the motor starts, the value of the rotor resistance $$\frac{Rr}{s}$$

is multiplied by almost 100 and it is possible to determine if the motor 10 has started, if the motor 10 is currently accelerating or if the motor 10 is rotating at a speed below its nominal speed, from the variation in the motor resistance.

The processing and control unit 35 is thus configured to apply such a measurement of the variation of the motor resistance to determine a power supply delay $t_{ret}$ of the motor during the motor start procedure.

Figure 3:
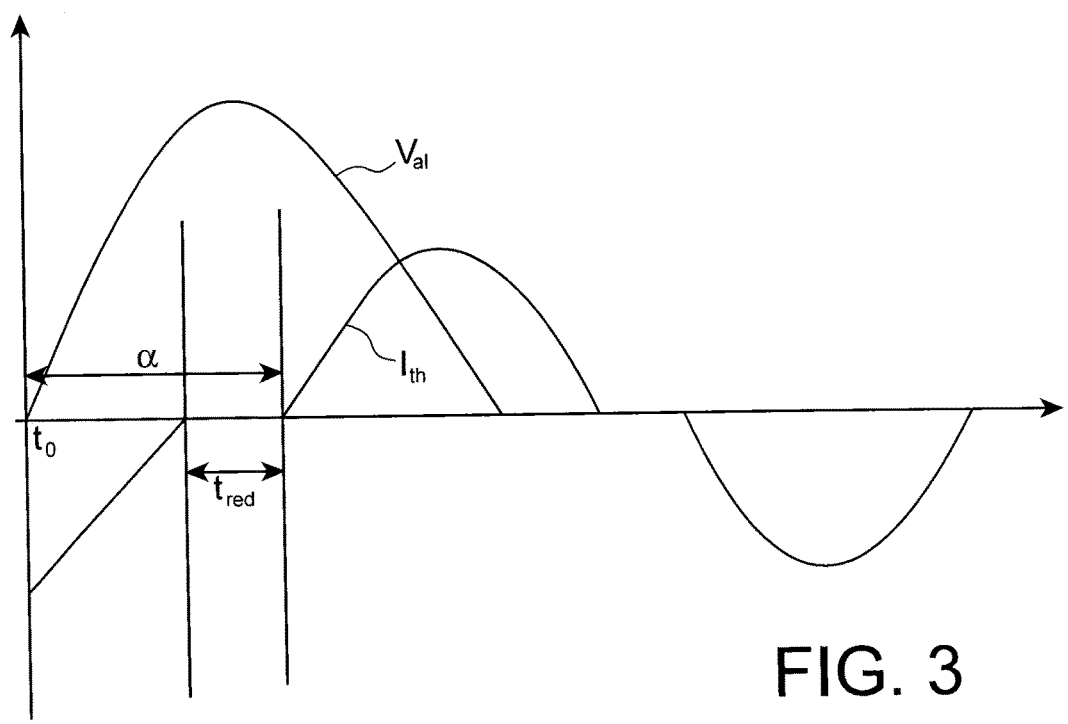
FIG. 3 shows the principle of current regulation with a starter device as shown in FIG. 1.

FIG. 3 shows the principle of such a method of starting the motor 10 when the adjustment of the current power supply delay $t_{ret}$ to the motor 10 is of the alpha ($\alpha$) type for a given phase 21a, b, c of the power supply circuit 20 during a positive voltage alternation of this phase.

The processing and control unit 35 detects when the phase voltage changes to zero in a rising front, starting from the corresponding voltage measurement system. Detection of this change to zero, t0 in FIG. 3, is the reference for application of the determining angular offset $\alpha$ for the current power supply to the trigger of the thyristor 32a corresponding to the positive alternation. Thus, the thyristor 32a corresponding to the positive alternation becomes conducting only when the processing and control unit 35 controls its closing by supplying power to its trigger after the angular offset $\alpha$. Under these conditions, the motor is powered with positive current with a delay $t_{ret}$ that limits the current increase and therefore limits the amplitude of the current demand during start up.

Figure 4:
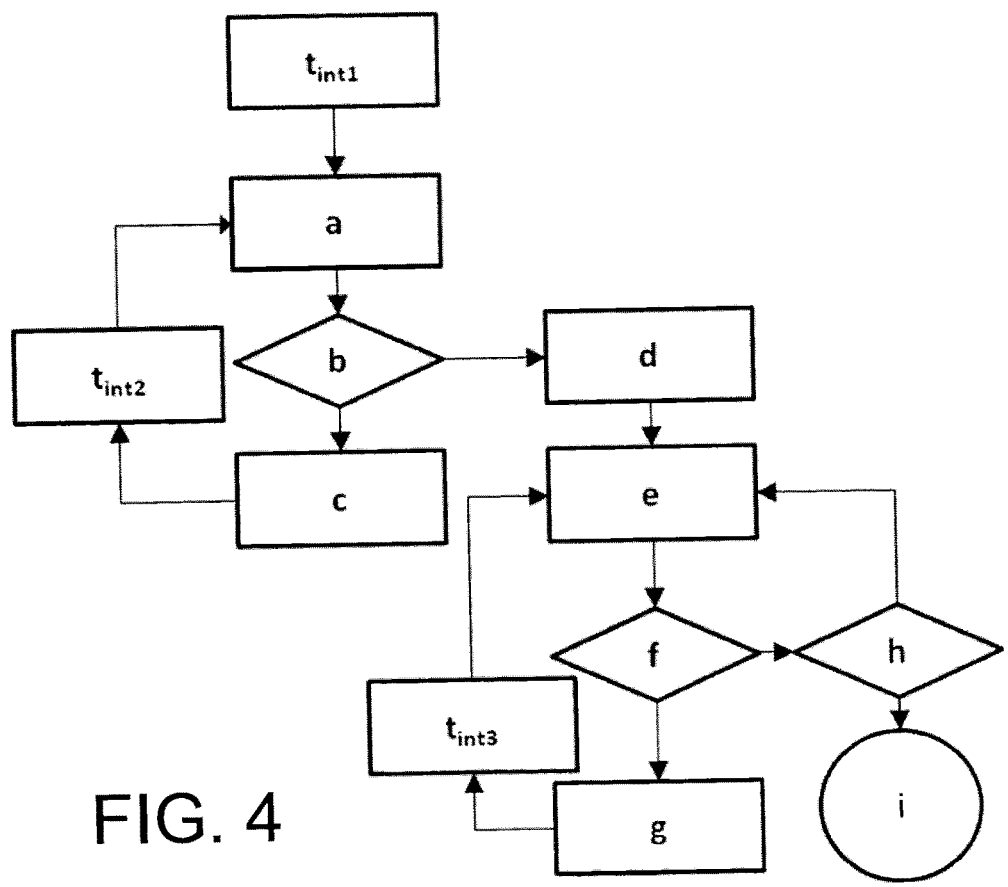
FIG. 4 is a flowchart describing chaining of the main steps in the method according to the invention.

The processing unit is configured to vary the angular offset $\alpha$ and therefore the current delay $t_{ret}$ while the motor is starting, using the starting method comprising the first and second sequences below and for which chaining of steps is described in the flow chart in FIG. 4.

After an initialisation time $t_{int}1$ and every $n^{th}$ period of the power supply voltage, where n is an integer more than 0, the first operating sequence of the starting method includes the following steps, a) determine the value of a variation in the resistance of the electric motor starting from the variation in the switch/motor resistance, b) compare the value of the variation of the determined motor resistance with a first threshold resistance value, c) if the value of the variation of the motor resistance is less than the first threshold value, reduce $t_{ret}$; then a waiting time $t_{int}2$ occurs before returning to step a).

d) if the value of the variation of the determined motor resistance is equal to or greater than the first threshold value, go to the second sequence in the starting method.

The second sequence comprises the following steps repeated every $m^{th}$ period of the power supply voltage, where m is an integer number more than 0:

e) determine the value of a variation in the motor resistance, f) compare said value of the variation of the determined motor resistance with a second threshold resistance value, g) if the determined value of the motor resistance variation is less than the second threshold resistance value, reduce $t_{ret}$.

Every time that step g) is carried out, the processing and control unit 35 is configured to wait for a time $t_{int}$ 3 before returning to step e).

The following steps are also carried out in the second sequence to detect when the motor has reached its nominal rotation speed:

h) compare the motor power supply current at instant t relative to the value of the motor power supply current at instant t−mT where T is the duration of one period of the alternating power supply voltage, i) if the motor power supply current at instant t is less than the value of the motor power supply current at instant t−mT, the motor is directly connected to the power supply circuit and the motor is then started.

In the first sequence, the calculation of the resistance variation in step a) is a calculation of the relative time variation such that:

$$\frac{\frac{\Delta R}{R}(t)}{\Delta t} = \frac{\frac{R(t)-R(t-nT)}{R(t-nT)}}{nT}$$

where R is the switch/motor resistance, T is the duration of a power supply voltage period and n is the number of periods of the power supply voltage between two repetitions of the first sequence, R(t) and R(t−nT) thus correspond to values of the calculated switch/motor resistance and the switch/motor resistance calculated during previous repetitions of the first sequence, respectively.

Similarly in the second sequence, the calculation of the resistance variation in step e) is a calculation of the relative time variation such that:

$$\frac{\frac{\Delta R}{R}(t)}{\Delta t} = \frac{\frac{R(t)-R(t-mT)}{R(t-mT)}}{mT}$$

where R is the switch/motor resistance, T is the duration of a period of the power supply voltage and m is the number of periods of the power supply voltage between two repetitions of the second sequence, R(t) and R(t−mT) thus correspond to values of the calculated switch/motor resistance and the switch/motor resistance calculated during previous repetitions of the second sequence, respectively.

The quality of the measurement of the switch/motor resistance during measurement of the resistance variation in step e) can be improved and the influence of oscillations of the resistance of the motor 10 when the motor 10 is rotating can be limited, if the resistance value is a digitally processed value such as an average value, a filtered value or any other value obtained with processing to limit the influence of oscillations in the calculation of the motor resistance.

In a conventional configuration like that shown in FIG. 1, and therefore for a three-phase power supply circuit operating at 50 Hz, in other words with a period of 20 ms, the method disclosed above may for example be applied with the following values:

the angular offset α may be about 120°, in other words 6.7 ms, which therefore corresponds to a delay $t_{ret}$ to supply current to the motor of 6.7 ms, n may be equal to à 2, in other words the first sequence is repeated every 40 ms, in c), as in step g), the angular offset α may be reduced every time by 1.8°, in other words 100 μs, which therefore corresponds to a reduction in the delay $t_{ret}$ equal to 100 μs, m may be equal to 1, which corresponds to a repetition of the second sequence every 20 milliseconds for a frequency of 50 Hz; an average of these values is made on the last 50 values.

The processing and control unit 35, being configured to vary the angular offset α and therefore the current delay $t_{ret}$ when the motor is starting using the starting method described above, is adapted to control the delay, current determination and voltage determination means, and to use the motor power supply current and voltage determination means to determine the variation in the motor resistance and to modify the delay $t_{ret}$ as a function of the variation of the motor resistance.

The control unit may be configured using a computer program comprising program code instructions to run steps to determine a variation in a motor resistance, to compare said variation with a threshold resistance value and to reduce the delay $t_{ret}$ if the variation is less than the threshold value using the starting method described above.

It should also be noted that in a conventional configuration, the initialisation times $t_{int}$ 1, $t_{int}$ 2, $t_{int}$ 3 are independent.

It should also be noted that if the start device 20 in this embodiment comprises systems for measuring the power supply circuit current and voltage, therefore on the input side of the switches, it would also be possible for the starter device 20 to comprise voltage and current measurement systems on the output side of the switches so as to enable direct determination of the variation of the resistance of motor 10, without going outside the scope of the invention.

The invention claimed is:

1. A starting method for an electric motor powered by an alternating power supply voltage of an alternating power supply circuit, the starting method, comprising:

supplying current to the electric motor during each voltage supply period with a delay $t_{ret}$; and performing a first sequence in which the following steps are carried out in each $n^{th}$ period of the alternating power supply voltage, where n is an integer number greater than 0, including:

first determining a value of a variation of an electric motor resistance during a previous n periods of the alternating power supply voltage, first comparing the determined value of the variation of the electric motor resistance with a first threshold resistance value, and if the value of the determined value of the variation of the electric motor resistance is less than the first threshold value, first reducing the delay $t_{ret}$, wherein the first sequence includes the following additional step:

if the value of the determined value of the variation of the electric motor resistance is equal to or greater than the first threshold value, proceeding onto a second sequence in the starting method, the second sequence comprising following steps performed every $m^{th}$ period of the alternating power supply voltage, where m is an integer more than 0, including:

second determining the value of the variation of the electric motor resistance, second comparing the determined value of the variation of the electric motor resistance with a second threshold resistance value, and
if the variation in the determined value of the variation of the electric motor resistance is less than that the second threshold resistance value, second reducing $t_{ret}$.

2. The starting method according to claim 1, wherein the first determining is a step to determine a relative variation in time of the electric motor resistance $$\frac{\frac{\Delta R}{R}(t)}{\Delta t}.$$

3. The starting method according to claim 2, wherein the relative variation in time of the electric motor resistance is calculated using the following equation:

$$\frac{\frac{\Delta R}{R}(t)}{\Delta t} = \frac{\frac{R(t) - R(t - nT)}{R(t - nT)}}{nT}$$

where R(t) is a value related to the electric motor resistance determined at instant t and T is a duration of a period of the alternating power supply voltage.

4. The starting method according to claim 1, wherein first determining, first comparing, and first reducing are applied after an initial duration $t_{int}1$.

5. The starting method according to claim 1, wherein after a reduction in the delay $t_{ret}$, the first sequence is repeated after a waiting time $t_{int}2$.

6. The starting method according to claim 1, wherein during the second determining, an acceleration or speed of the electric motor is also determined from the determined value of the variation of the electric motor resistance.

7. The starting method according to claim 1, wherein in the second determining, the determined value of variation of the electric motor resistance is a value corrected over at least two periods of the alternating power supply voltage.

8. The starting method according to claim 1, wherein the second comparing is a step to determine the value of the relative variation of the electric motor resistance in time.

9. The starting method according to claim 8, wherein the value of the relative variation of the electric motor resistance in time is calculated using the following equation:

$$\frac{\frac{\Delta R}{R}(t)}{\Delta t} = \frac{\frac{R(t) - R(t - mT)}{R(t - mT)}}{mT}$$

where R(t) is the resistance value of the electric motor determined at instant t and T is the duration of a period of the alternating power supply voltage.

10. The starting method according to claim 1, wherein following additional steps are also included in the second sequence:
comparing a value of a power supply current to the electric motor at instant t with a value of the power supply current to the electric motor at instant t−mT where T is the duration of a period of the alternating power supply voltage, if the value of the power supply current to the electric motor at instant t is less than the value of the power supply current to the electric motor at instant t−mT, connecting the electric motor to the alternating power supply circuit directly, and
then starting the electric motor.

11. The starting method according to claim 1, in which if the delay $t_{ret}$ is reduced in the second reducing and the second threshold resistance value is increased, a waiting time $t_{int}3$ is defined before repeating the second sequence.

12. A device for starting an electric motor powered by an alternating power supply voltage of an alternating power supply voltage circuit, the device comprising:
switches each configured to delay the power supply to the electric motor with a delay $t_{ret}$;
a current meter configured to measure the power supply current to the electric motor on the output or input side of the switches;
a voltage meter configured to determine the alternating power supply voltage to the electric motor on the input or output side of the switches; and
processing circuitry configured to control the switches, and the current and voltage meters,
wherein the processing circuitry is further configured to determine the value of the variation in the electric motor resistance and to modify the delay $t_{ret}$ as a function of the value of the variation of the electric motor resistance using a starting process, starting from the current and voltage meters,
wherein the process circuitry is further configured to implement the starting process by being configured to
supply current to the electric motor during each volta e supply period with a delay $t_{ret}$; and
perform a first sequence in which the following steps are carried out in each $n^{th}$ period of the alternating power supply voltage, where n is an integer number greater than 0, including:
first determine a value of a variation of an electric motor resistance during a previous n periods of the alternating power supply voltage,
first compare the determined value of the variation of the electric motor resistance with a first threshold resistance value, and
if the value of the determined value of the variation of the electric motor resistance is less than the first threshold value, first reduce the delay $t_{ret}$,
wherein the first sequence includes the following additional step:
if the value of the determined value of the variation of the electric motor resistance is equal to or greater than the first threshold value, proceed onto a second sequence in the starting method, the second sequence comprising following steps performed every $m^{th}$ period of the alternating power supply voltage, where m is an integer more than 0, including:
second determine the value of the variation of the electric motor resistance,
second compare the determined value of the variation of the electric motor resistance with a second threshold resistance value, and
if the variation in the determined value of the variation of the electric motor resistance is less than that the second threshold resistance value, second reduce $t_{ret}$.

13. A non-transitory computer readable medium having stored thereon a program that when executed by a computer causes the computer to execute a starting method for an electric motor powered by an alternating power supply voltage of an alternating power supply circuit, the starting method, comprising:

supplying current to the electric motor during each voltage supply period with a delay $t_{ret}$; and performing a first sequence in which the following steps are carried out in each $n^{th}$ period of the alternating power supply voltage, where n is an integer number greater than 0, including:

first determining a value of a variation of an electric motor resistance during a previous n periods of the alternating power supply voltage, first comparing the determined value of the variation of the electric motor resistance with a first threshold resistance value, and if the value of the determined value of the variation of the electric motor resistance is less than the first threshold value, first reducing the delay $t_{ret}$, wherein the first sequence includes the following additional step:

if the value of the determined value of the variation of the electric motor resistance is equal to or greater than the first threshold value, proceeding onto a second sequence in the starting method, the second sequence comprising following steps performed every $m^{th}$ period of the alternating power supply voltage, where m is an integer more than 0, including:

second determining the value of the variation of the electric motor resistance, second comparing the determined value of the variation of the electric motor resistance with a second threshold resistance value, and if the variation in the determined value of the variation of the electric motor resistance is less than that the second threshold resistance value, second reducing $t_{ret}$.

* * * * *